United States Patent

[11] 3,600,770

| [72] | Inventor | Horace P. Halling<br>Leverstock Green, England |
| --- | --- | --- |
| [21] | Appl. No. | 867,572 |
| [22] | Filed | Oct. 20, 1969 |
| [45] | Patented | Aug. 24, 1971 |
| [73] | Assignee | Avica Equipment Limited<br>Hemel Hempstead, Hartfordshire, England |
| [32] | Priority | Apr. 29, 1969 |
| [33] | | Great Britain |
| [31] | | 21874/69 |

[54] CIRCULAR CLAMPS
11 Claims, 5 Drawing Figs.

[52] U.S. Cl. .................................................... 24/279,
   285/411
[51] Int. Cl. ............................................... B65d 63/06
[50] Field of Search............................................. 24/279-
   —285; 138/99; 285/365—367, 407—411

[56] References Cited
UNITED STATES PATENTS

| 2,653,836 | 9/1953 | Christophersen et al. ..... | 285/411 |
| --- | --- | --- | --- |
| 3,019,036 | 1/1962 | Stanger ........................ | 285/411 X |

FOREIGN PATENTS

| 1,403,430 | 5/1965 | France ........................ | 24/285 |
| --- | --- | --- | --- |
| 1,140,636 | 1/1969 | Great Britain ................ | 24/279 |

*Primary Examiner*—Donald A. Griffin
*Attorney*—Dowell and Dowell

ABSTRACT: The invention relates to a circular clamp for clamping flanges, which comprises a body having a clamping strap supporting interiorly thereof at least one flange engaging member; and at least two lugs which are pulled together by a nut and bolt to tighten the body around the flanges, each lug being fast with a reinforced free end portion of the clamping strap, and the bolt being pivotally attached to one of the lugs. There will be two lugs and one nut and bolt arrangement when the clamp is in the form of a split ring, and there will be four lugs and two nut and bolt arrangements when the clamp is in the form of two separate half circles. Usually the clamping strap will have pivotal flange-engaging members attached to its inner face, and the flanges to be joined are preferably V-flanges.

Patented Aug. 24, 1971

Inventor
Horace Percival Halling
By
Drivell Nowell
Attorneys

Patented Aug. 24, 1971 3,600,770
3 Sheets-Sheet 2
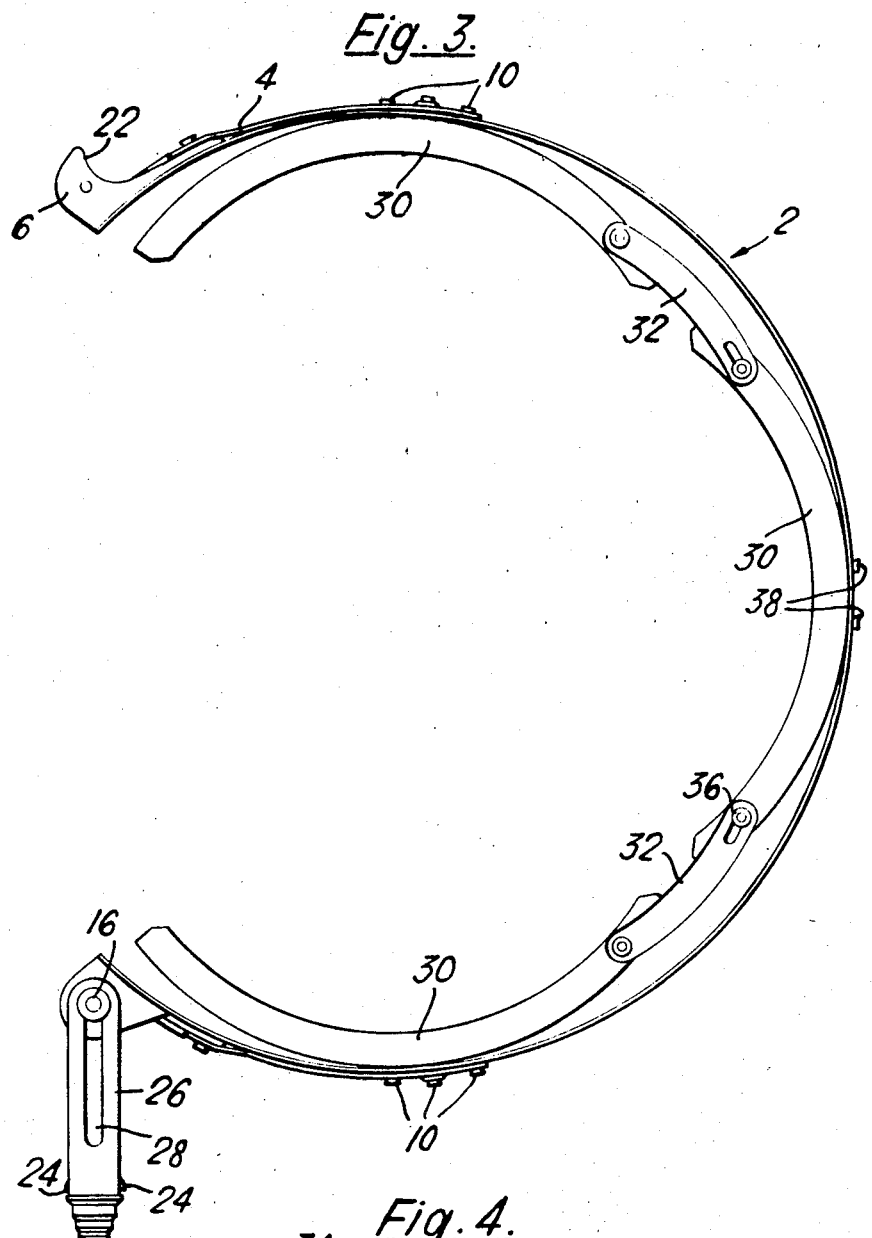
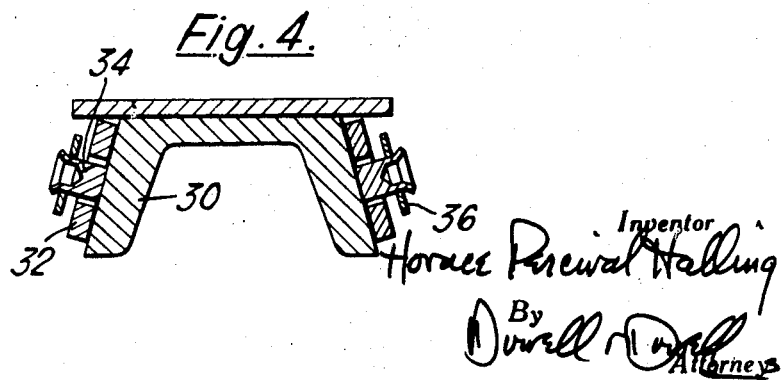

Patented Aug. 24, 1971

CIRCULAR CLAMPS

This invention relates to circular clamps of the type which are tightened around parts to be joined by one or more nut and bolt arrangements.

Clamps are known comprising a clamping strap which is doubled back on itself at one or both ends. The head of a bolt is retained within a loop formed by doubling back the end of the clamping strap and the head of the bolt can pivot in the loop. Such clamps frequently fail in the region where the clamping strap had been doubled back on itself.

It is an aim of this invention to provide a circular clamp which is not subject to failure and which is compact and can quickly and easily be released from an operative position. We have found that this aim can be achieved by forming a clamp with lugs which are each fast with a reinforced end of the clamps.

Accordingly, this invention provides a circular clamp for clamping flanges, which comprises a body having a clamping strap supporting interiorly thereof at least one flange at least two lugs which are pulled together by a nut and bolt, to tighten the body around the flanges each lug being fast with a reinforced free end portion of the clamping strap and the bolt being pivotally attached to one of the lugs.

Usually, each free end portion of the clamping strap will be reinforced with a reinforcing strap portion.

The clamps of the present invention have wide application in, for example, aircraft and in attaching pumps, electrical generators and starter motors directly to engine casing flanges.

Preferably, each lug will be rivetted to the clamping strap and the reinforcing strap portion. Also, there may be separate rivets rivetting the reinforcing strap portion to the clamping strap. If desired, a part of each lug may be countersunk to receive a part of the reinforcing strap portion.

The circular clamps may include safety means which will retain the clamp around parts to be joined if the bolt or bolts fail. Thus, for example, the safety means may comprise a link which is hinged to the or each lug bearing a bolt and may be adapted to extend over the or each corresponding lug when the clamp is bolted up, the link being such that on failure of its associated bolt, it will retain the clamp around the parts to be joined to an extent sufficient to prevent the parts to be joined from separating completely. Advantageously, the link is provided with a longitudinal slot through which a pin passes to secure the link to the clamp, the length of the bolt being such as to allow the link to extend over the corresponding lug prior to the clamp being tightened and thereafter to prevent the clamp from separating completely if the bolt fails.

The link may be U-shaped, the base thereof being provided with a hole through which, in use, the free end of the hinged bolt passes, either each of the arms of the link or each side of the portion of the clamp which is engaged by the link being formed with a projection, and the clamp or link arms respectively being formed with corresponding grooves to receive the projections, the arrangement being such that the link is prevented from falling off the end of the clamp during use once it has been positioned thereon.

Each nut may act directly on the corresponding lug that does not contain the bolt. However, preferably, each nut acts through the intermediary of a saddle washer.

Clamps as described above which are provided with reinforcing means in the region of the lugs can normally be used even under very severe conditions without failing. However, if desired, the clamp may be provided with at least two separate segments which bear on the parts to be clamped together as the clamp is tightened and which are each fast with the clamp. These segments reduce the possibility of clamp failure between the lugs but, as indicated above, the risk of failure between the lugs is usually extremely slight. Preferably the segments are joined by links such that the segments can pivot radially with respect to each other. Whilst the segments may be joined to the clamping straps over the whole of their adjacent surfaces it is preferred that the segments be rivetted at appropriate places to the clamping strap.

The clamps of this invention may be in the form of a split ring so that the clamp only has two free ends and one nut and bolt arrangement. However if desired, for example where the parts to be joined have a large circumference, the clamp may be in the form of two, three or more separate parts. Each separate part will of course be adapted to be bolted to an adjacent part by a nut and bolt arrangement as described. Thus, when the clamp is in the form of two separate halves, there will be two nut and bolt arrangements with the tow bolts preferably being hinged to the two free ends of the same half of the clamp.

The various parts of the circular clamps of the present invention may be made of any suitable material commensurate with the environment in which the clamp is to be used. Usually, most parts of the clamp including the clamping strap, the reinforcing strap portion, the bolts and the safety means will be made from stainless steel. Where the clamp is to withstand the effect of very high temperatures, a nickel-base heat resisting alloy may be used in lieu of stainless steel. The rivets may be of any suitable material, Monel metal rivets being presently preferred.

Each link connecting the separate segments together is preferably curved so that when the clamp is in position on the parts to be joined, the links form part of a circle and do not rub against the parts to be joined or prevent the separate segments from fully mating with the parts to be joined. Advantageously, the inner surface of each segment is treated with a lubricant, preferably a dry film lubricant.

The inner surface of the separate segments will of course be appropriately contoured to suit the parts to be joined. For example, where the parts to be joined have flanges such as V-shaped flanges, the inner surface of the segments will be V-shaped in cross section to receive the V-flanges. If, for example, one conduit is to be clamped within another conduit, the separate segments can be of any appropriate shape in cross section provided that this shape enables the segments to bear with the desired force against the conduits when the clamp is bolted together.

The invention will now be described by way of example with reference to the accompanying drawings in which:

FIG. 3 shows the clamp of FIG. 1 is an open position;

FIG. 4 is a section of the clamp of FIG. 1 on the line B—B; and

In the accompanying drawings like parts have been given the same number.

Figure 1:
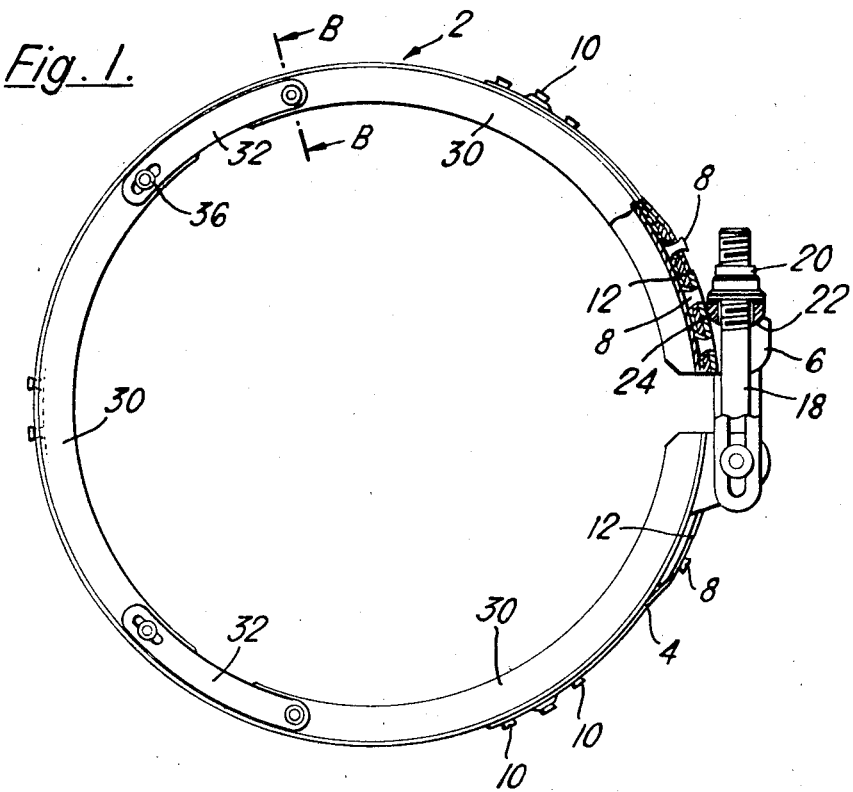
FIG. 1 shows a split ring clamp in accordance with this invention in a closed position.
Figure 2:
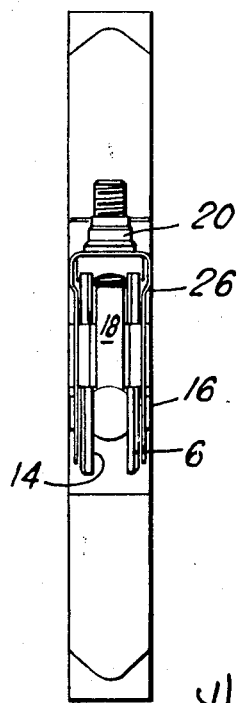
FIG. 2 is a front end view of the clamp shown in FIG. 1.

Referring now to FIGS. 1 to 4, the clamp has a stainless steel strap 2. The free ends of the strap 2 are provided with a reinforcing strap portion 4. A lug 6 is provided between each portion 4 and the strap 2 ans flush rivets 8 pass through the portion 4, lug 6 and strap 2. The portion 4 is also rivetted to the strap 2 by rivets 10. As will be seen from FIG. 1, the lugs 6 are countersunk at 12 to receive the reinforcing strap portion 4. Each lug 6 is provided with a strengthener 14 which is rivetted to the lug at the rear and is spot-welded at the sides.

A trunnion 16 is attached between the two arms of one lug 6 and supports a pivotable bolt 18. The bolt 18 is adapted to protrude above the lug 6 so that a nut 20 can be screwed thereon. As is most clearly seen from FIGS. 1 and 3, the upper surface 22 of the other lug 6 is concave and receives a saddle washer 24 which is pressed against the surface 22 when the nut 20 is screwed into the bolt 18.

Also fixed to the trunnion 16 is a U-shaped link 26 which has a longitudinal slot 28 in its body. The slot 28 enables the link to be swung onto the top of the saddle washer 24 when the clamp is to be used, the bolt 18 passing through a hole in the base of the link 26.

Rivetted to the strap 2 are separate stainless steel segments 30 joined together by stainless steel links 32. The segments 30 are of V-shaped cross section and the free ends of each segment are chamfered to avoid gouging. The links 32 are attached to the sides of the segments 30 as can most clearly be seen in FIG. 4 by pins 34 which have been stud welded to the segments 30 or are fitted into sockets (not shown) in the segments 30 and high temperature brazed. The outer ends of the pins 34 are hollow and are ball-peened out to retain washers 36. However, if desired, the outer ends of the pins 34 can be solid and can be subjected to cold rivetting to form the traditional domed rivet head. The pins 34 thus securely retain the links 32 to the segments 30 whilst permitting the links 32 and segments 30 to pivot with respect to each other. One end of each link 32 does not carry any load during normal manual operation of the clamp.

As shown in FIG. 3, the clamp opens to an extent sufficient to enable it to be placed over two flanges to be clamped together. The free ends of the clamp are then brought together and the bolt 18 and the link 26 are swung to project above the other lug 6 whereafter the nut 20 is screwed onto the bolt 18 and the clamp in its closed operable position is as shown in Fig. 1.

Since the strap 2 is rivetted to the segments 30, any failure of the strap, e.g. due to prolonged exposure to high temperatures, between the portion 4 and the rivets 38 does not matter since the various rivets will stop the strap 2 moving relative to the segments 30. Also, the link 26 is provided in case the bolt 18 should fail and it will prevent the clamp from opening to such an extent that it will fall off the flanges to which it is attached.

Figure 5:
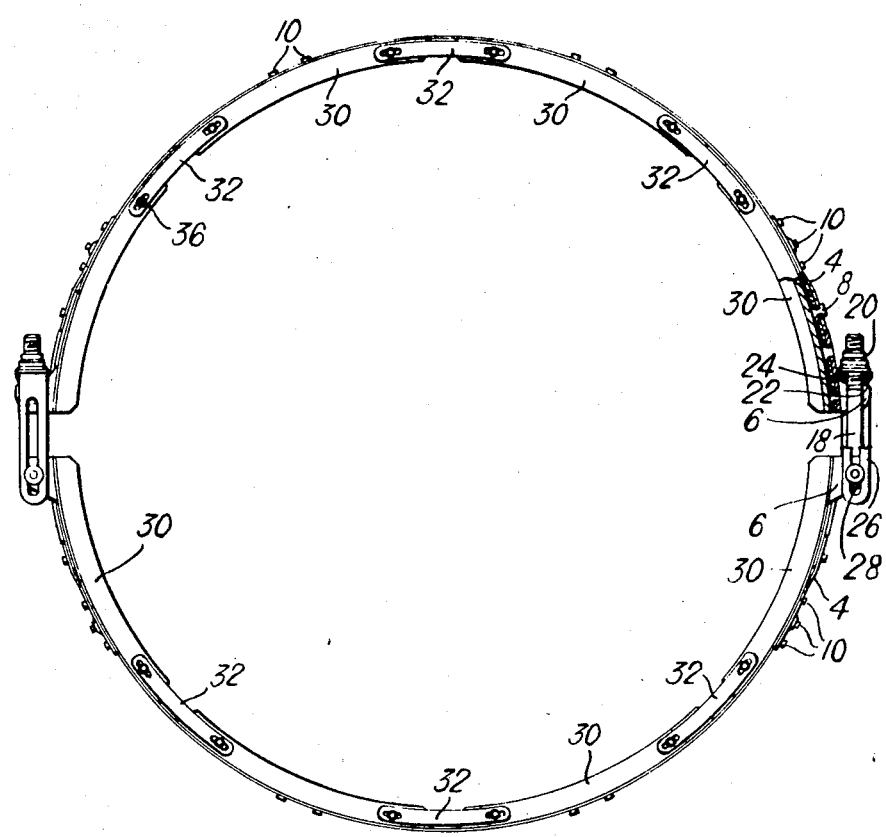
FIG. 5 shows in a closed position a clamp in accordance with this invention having two separate halves.

Referring now to FIG. 5, there is shown a clamp in accordance with the invention and which is formed in two parts. The two part construction thus has two nut and bolt arrangements at the free ends of the clamp so that by tightening both nut and bolts, the clamp can be tightened with substantially equal force around the whole of its circumference on a pair of flanges. The various parts of the clamp are similar to those shown and described with reference to FIGS. 1 to 4 and do not need to be described again.

I claim:

1. A circular clamp for clamp for clamping flanges, which comprises a body having a clamping strap supporting interiorly thereof at least one flange-engaging member and at least two lugs which are pulled together by a nut and bolt to tighten the body around the flanges, each lug being fast with a reinforced free end portion of the clamping strap, and the bolt being pivotally attached to one of the lugs.

2. A clamp according to claim 1, in which each free end portion of the clamping strap is reinforced with a reinforcing strap portion.

3. A clamp according to claim 1 including safety means adapted to retain the clamp around parts to be joined if the bolt or bolts fail.

4. A clamp according to claim 3 in which the safety means comprises a link which is hinged to each lug bearing a bolt and is adapted to extend over each corresponding lug when the clamp is bolted up, the link being such that on failure of its associated bolt, it will retain the clamp loosely around the flanges.

5. A clamp according to claim 4 in which the link is provided with a slot through which a pin passes to secure the link to the clamp, the length of the slot being such as to allow the link to extend over the corresponding lug prior to the clamp being tightened and thereafter to prevent the clamp from separating completely if the bolt fails.

6. A clamp according to claim 4 in which the link is U-shaped, the base thereof being provided with a hole through which, in use, the free end of the hinged bolt passes.

7. A clamp according to claim 1 including at least two separate flange-engaging members which are each fast with the clamping strap.

8. A clamp according to claim 7 in which the flange-engaging members are joined by links such that the flange-engaging members can pivot radially with respect to each other.

9. A clamp according to claim 1 having only two free end portions and one nut and bolt arrangement.

10. A clamp according to claim 1 in which the body is formed in two separate portions, there being two nut and bolt arrangements.

11. A clamp according to claim 1 in which the inner surface of each flange-engaging member is V-shaped in cross section.